(12) United States Patent
Toriumi et al.

(10) Patent No.: US 7,861,626 B2
(45) Date of Patent: Jan. 4, 2011

(54) LENS SURFACE CUTTING APPARATUS AND LENS SURFACE CUTTING METHOD FOR SPECTACLE LENS, AND SPECTACLE LENS

(75) Inventors: Hideo Toriumi, Tokyo (JP); Shigeru Takizawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 292 days.

(21) Appl. No.: 11/665,731

(22) PCT Filed: Dec. 20, 2006

(86) PCT No.: PCT/JP2006/025375

§ 371 (c)(1),
(2), (4) Date: Apr. 18, 2007

(87) PCT Pub. No.: WO2007/072857

PCT Pub. Date: Jun. 28, 2007

(65) Prior Publication Data

US 2009/0047874 A1 Feb. 19, 2009

(30) Foreign Application Priority Data

Dec. 22, 2005 (JP) .............................. 2005-370025

(51) Int. Cl.
*B23B 1/00* (2006.01)
*B23B 7/00* (2006.01)

(52) U.S. Cl. ......................................... 82/118; 82/1.11

(58) Field of Classification Search ................... 82/1.11, 82/118; 451/5, 240

See application file for complete search history.

(56) References Cited

U.S. PATENT DOCUMENTS

| | | | | |
|---|---|---|---|---|
| 3,802,759 | A | * | 4/1974 | Andersson ................ 359/216.1 |
| 5,217,335 | A | * | 6/1993 | Houchens et al. ............. 409/80 |
| 5,341,604 | A | * | 8/1994 | Wood ............................. 451/5 |
| 6,227,952 | B1 | * | 5/2001 | Diehl et al. .................. 451/140 |
| 6,991,525 | B2 | * | 1/2006 | Diehl et al. .................... 451/65 |
| 2003/0043343 | A1 | * | 3/2003 | Diehl et al. .................. 351/177 |

FOREIGN PATENT DOCUMENTS

| | | |
|---|---|---|
| EP | 0849038 A | 6/1998 |
| JP | 07-067659 B | 7/1995 |
| JP | 2003-053602 A | 2/2003 |
| JP | 2003-525760 A | 9/2003 |
| JP | 2005-001100 A | 1/2005 |

* cited by examiner

*Primary Examiner*—Will Fridie, Jr.
(74) *Attorney, Agent, or Firm*—Blakely, Sokoloff, Taylor & Zafman

(57) ABSTRACT

A lens surface cutting method for a spectacle lens includes the steps of calculating the mean curvature of a lens surface (5) to be machined, calculating a helical machining path (4) that matches the mean curvature, and cutting the lens surface (5) to be machined by a cutting means. The helical machining path (4) calculated by the helical machining path calculating step is a path in which helix spacings $P (=P_1, P_2, \ldots P_n)$ on the lens surface (5) to be machined are equidistant and a helix spacing $d (=d_1, d_2, \ldots d_n)$ on an X-Y projection plane 100 increases continuously from a lens outer periphery toward a center. The cutting means cuts the lens surface (5) to be machined from the outer periphery toward the center along the helical machining path (4). Thus, a spectacle lens having a lens surface with a surface accuracy that is almost uniform throughout an entire surface can be obtained.

9 Claims, 7 Drawing Sheets

LENS SURFACE CUTTING APPARATUS AND LENS SURFACE CUTTING METHOD FOR SPECTACLE LENS, AND SPECTACLE LENS

This is a non-provisional application claiming the benefit of International application number PCT/JP2006/325375 filed Dec. 20, 2006.

TECHNICAL FIELD

The present invention relates to lens surface cutting apparatus and lens surface cutting method for a spectacle lens, and a spectacle lens.

BACKGROUND ART

In the manufacture of a spectacle lens, cutting and polishing of the lens surface to be machined of a cast and molded blank (semi-finished spectacle lens) form an optical surface having a desired curved surface. The general shape of the spectacle lens forms a meniscus, and its optical surface comprises a convex curved surface and concave curved surface.

Examples of the optical surface shape of the spectacle lens comprise, in addition to a spherical surface, an aspherical surface, a progressive surface, an aspherical surface having a progressive element, and the like to correct various types of refraction errors of an eye ball. Usually, the lens surface to be machined of the spectacle lens is cut by a lathe or milling machine, as disclosed in, e.g., European Patent Laid-Open No. EP0849038A2.

The machining path of cutting usually forms a helical shape. Cutting is done by setting the cutter to have a constant feed pitch in a horizontal direction perpendicular to the helix of the cutter. Accordingly, the helix spacings of the helical machining path become equidistant on an X-Y projection plane, as disclosed in, e.g., Japanese Patent Laid-Open No. 2003-525760, and do not become constant on the lens surface but decrease gradually from the outer periphery of the lens toward the center. This is due to the following reason. As the machining spindle exists on an X-Y plane, setting the feed pitch in the horizontal direction to have constant spacings can facilitate control. As the number of types of lenses is large, it is cumbersome to calculate helical machining paths that match the individual lens shapes, and control them. In the present invention, the X-Y projection plane refers to a plane in, e.g., a meniscus spectacle lens, which is perpendicular to the optical axis of the lens.

As a prior art, for example, Japanese Patent Publication No. 7-67659 proposes a machining data generating method which minimizes the cutting resistance of a cutter on the basis of a plurality of patches (surface elements that form a geometric model curved surface) on a free-form surface.

DISCLOSURE OF INVENTION

Problem to be Solved by the Invention

As shown in FIG. 13, a lens surface 115 to be machined of a spectacle lens 100 generally forms a curved surface which has a geometrical center 120 horizontal with respect to an X-Y projection plane 101 and which forms a gradient, with respect to the X-Y projection plane 101, that increases as the distance from the geometrical center 120 increases. A machining path 114 of the lens surface 115 to be machined, which is formed by a cutter (cutting means) comprising a cutting tool or milling machine is a helical machining path which runs from the geometrical center 120 toward the outer periphery while going around, as described above. Thus, helix spacings M on the X-Y projection plane 101 are equidistant when observed by orthogonal projection.

As described above, if the lens surface 115 to be machined is helically cut such that the helix spacings M of the helical machining path 114 on the X-Y projection plane 101 become equidistant, helix spacings S on an actually machined lens surface 112 do not become equidistant. On the peripheral portion where the gradient is large, the number of tracks of machining path 114 per unit area on the lens surface 112 decreases, and accordingly the helix spacings M become large. On the other hand, at the central portion of the lens surface 112, the number of tracks of the machining path 114 per unit area increases, and accordingly the helix spacings M become small. Therefore, the surface roughness of the lens surface 112 is large at the peripheral portion and small at the central portion due to the difference in density of the tracks of the helical machining path 114.

The lens surface 112 which is cut by the conventional machining method along the machining path 114 has large roughness and varies largely, as shown in FIG. 14, and extreme roughness (maximal surface roughness Rmax=0.30 μm) occurs in part of the lens surface 112. The measurement range of the lens surface 112 covers a range spaced apart from the geometrical center 120 by 25 mm to 30 mm in the radial direction. The diameter of the lens is 75 mm.

Polishing in the post process forms the cut lens surface 112 into an optical surface formed of a desired curved surface. If the surface roughness of the lens surface 112 is large, a polishing removal amount necessary to obtain a mirror surface increases. Therefore, with the helical machining path 114 formed by the conventional cutting method, when polishing the cut lens surface 112 using a polishing apparatus, particularly one having polishing removal amount characteristics (see a curve 51 in FIG. 11) indicating a truncate Gaussian distribution (a Gaussian distribution with a shape the top of which is cut), the central lens portion forms a mirror surface at a considerably early stage. To make the peripheral portion to form a mirror surface, polishing must be continued furthermore. This increases the time required for polishing.

When the polishing time prolongs, the difference between the polishing removal amount at the lens central portion and that at the peripheral portion increases. This increases the error between the surface shape obtained by cutting and that obtained by polishing, leading to an optical surface which is different from a desired surface shape.

The invention described in Japanese Patent Publication No. 7-67659 shows a method of calculating machining data from the surface shape. If the surface shape is complex as in a progressive power lens having a shape other than a spherical shape, or a toric lens, because the cutter reciprocates along an X-axis, a backlash occurs to make it impossible to generate a desired surface shape.

The present invention has been made to solve the conventional problems described above, and has as its object to provide lens surface cutting apparatus and lens surface cutting method for a spectacle lens, which can cut a lens surface to be machined such that the surface roughness becomes almost uniform throughout the entire surface.

It is another object of the present invention to provide a spectacle lens which is fabricated by the lens surface cutting method.

Means of Solution to the Problems

In order to achieve the above objects, a lens surface cutting apparatus for a spectacle lens according to the present invention comprises mean curvature calculating means for calculating a mean curvature of a lens surface to be machined of the spectacle lens, helical machining path calculating means for calculating a helical machining path which matches the mean curvature and a helix spacing of which increases continuously on an X-Y projection plane from a lens outer periphery toward a center, cutting means for helically cutting the lens surface to be machined, and control means for controlling the cutting means such that the cutting means cuts the lens surface to be machined along the helical machining path.

A lens surface cutting method for a spectacle lens according to the present invention comprises the steps of calculating a helical machining path with a helix spacing that increases continuously on an X-Y projection plane from a lens outer periphery toward a center, and helically cutting a lens surface to be machined of the spectacle lens by cutting means.

A spectacle lens according to the present invention has a lens surface which is formed by a lens surface cutting method for a spectacle lens according to the above invention.

EFFECTS OF THE INVENTION

According to the present invention, the helical machining path calculated by the helical machining path calculating means is a helix the helix spacing of which continuously increases on the X-Y projection plane from the lens outer periphery toward the center. When cutting the lens surface to be machined along the helical machining path, a lens surface with surface roughness that is almost uniform throughout the entire surface can be obtained. Hence, the polishing removal amount becomes equal between the lens central portion and the outer peripheral portion. This can shorten the polishing time. If the polishing removal amount becomes equal throughout the entire surface, an optical surface in which an error between a surface shape obtained by cutting and a surface shape after polishing is small can be obtained.

According to the present invention, a spectacle lens having an optical surface in which an error between a surface shape obtained by cutting and a surface shape after polishing is small can be obtained.

BEST MODE FOR CARRYING OUT THE INVENTION

Figure 1:
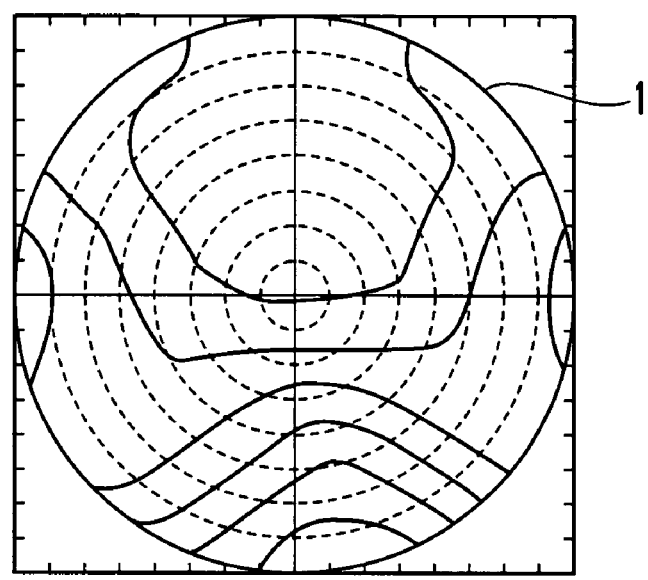
FIG. 1 is an S dioptric power (average power) distribution graph of a progressive power lens.
Figure 2:
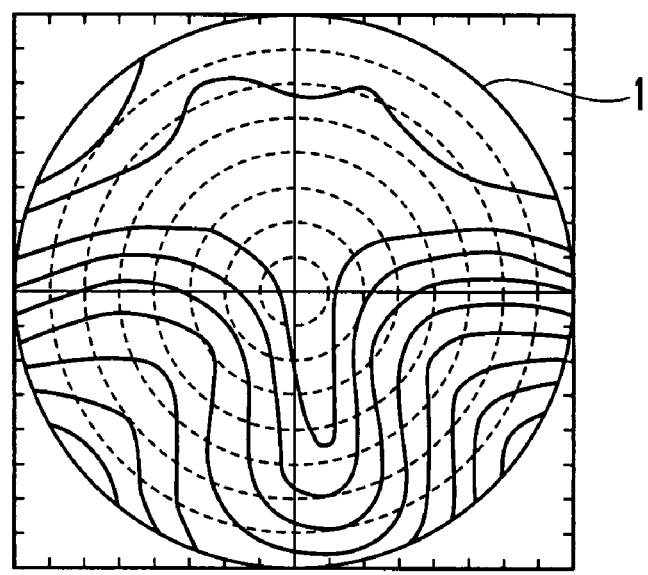
FIG. 2 is a C dioptric power (astigmatism) distribution graph of the progressive power lens.
Figure 3A:
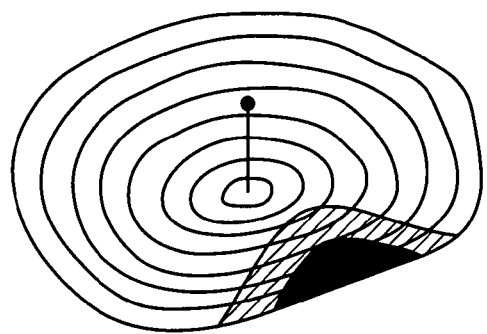
FIG. 3A is a bird's-eye view corresponding to the S dioptric power distribution of FIG. 2.
Figure 3B:
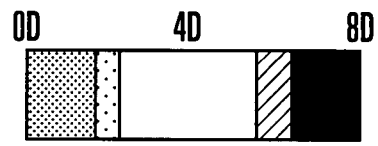
FIG. 3B is a view showing the lens dioptric power of FIG. 3A.
Figure 4A:
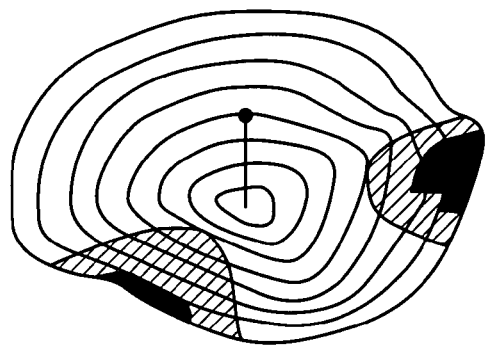
FIG. 4A is a bird's-eye view corresponding to the C dioptric power of FIG. 3A.
Figure 4B:
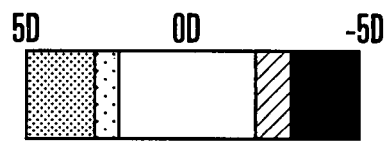
FIG. 4B is a view showing the lens dioptric power of FIG. 4A.

The present invention will be described in detail based on an embodiment shown in the drawings.

First, a spectacle lens to which the present invention is directed will be described.

The spectacle lens to which the present invention is directed is a lens used as a presbyopic progressive power lens. The progressive power lens is generally used widely due to an advantage that it will not be easily recognized as a presbyopic spectacle from its outer appearance in spite of being a presbyopic spectacle lens, and because it allows the wearer to have a clear continuous vision ranging from a long point to a near point with no discontinuity.

For example, firstly, the progressive power lens to be machined according to the present invention is a one-sided progressive power lens having a progressive surface either on the first refractive surface as an object-side surface and the second refractive surface as an eye ball-side surface. Secondly, the progressive power lens to be machined according to the present invention is a double-sided aspherical surface type progressive power lens which comprises a progressive power function distributed between the first refractive surface and second refractive surface and which provides distance power and addition power on the basis of prescribed values by the combination of the first and second surfaces.

A progressive power lens 1 has a refractive power distribution shown in, e.g., FIGS. 1 to 4B. Such a lens will be referred to as a spectacle lens hereinafter.

The lens base material of the spectacle lens is preferably a plastic lens base material and more preferably a plastic lens base material for a spectacle. For example, examples of the lens base material may include a copolymer of methyl methacrylate and one or more types of other monomers, a copolymer of diethylene glycol bisallyl carbonate and one or more types of other monomers, polycarbonate, polystyrene, polythiourethane, a sulfido resin utilizing an ene-thiol reaction, a sulfur-containing vinyl polymer, and the like, but are not limited to them.

Figure 5:
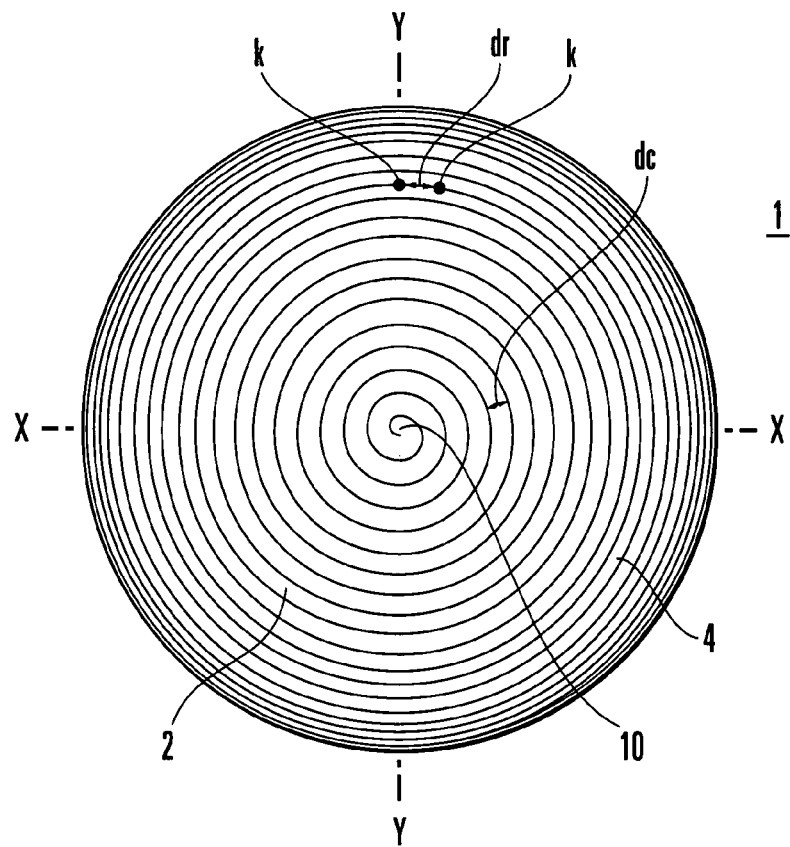
FIG. 5 is a projection view obtained by projecting a machining path formed by a lens surface cutting apparatus according to the present invention onto an X-Y projection plane.
Figure 6:
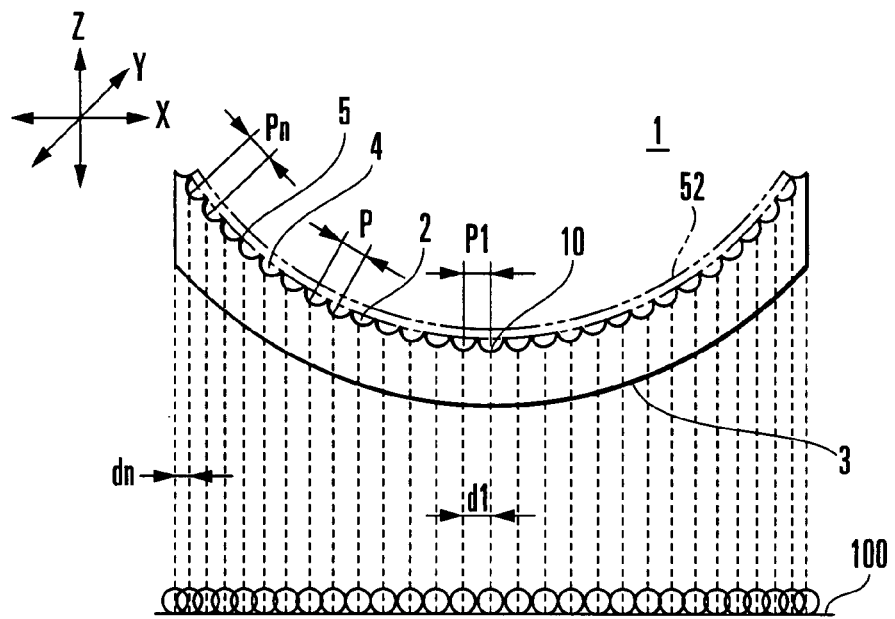
FIG. 6 is a sectional view of a spectacle lens after cutting.

Referring to FIGS. 5 and 6, the spectacle lens 1 formed of a circular semi-finished lens has a concave lens surface 2 which has been cut, and a convex lens surface (lens surface to be machined) 3 before cutting. The lens surface 2 has a helical machining path 4 formed by cutting. Reference numeral 5 denotes a concave lens surface (lens surface to be machined) before cutting.

First, the three-dimensional coordinate axes of the spectacle lens 1 will be defined as follows. FIG. 5 is a projection view of the spectacle lens 1 seen from the concave lens surface 2. In FIG. 5, the meridian direction (vertical direction) and horizontal direction of the spectacle lens 1 are respectively determined as the Y-axis and X-axis, and their intersection (to be referred to as a geometrical center hereinafter) 10 is determined as the origin of the coordinate system. In FIG. 5, a direction that passes through the geometrical center 10, runs from the concave lens surface 2 of the spectacle lens 1 toward the convex lens surface 3, and is perpendicular to the X- and Y-axes is determined as the Z-axis direction.

The first embodiment uses a conventionally known numerically controlled curve generator 27 (to be described later) as a lens surface cutting apparatus which cuts the lens surfaces 3 and 5 to be machined of the spectacle lens 1. In the curve generator 27, a cutter (cutting means) does not rotate, but the spectacle lens 1 is rotated at its geometrical center 10 to sequentially cut the lens surfaces 3 and 5 to be machined. When cutting the lens surfaces 3 and 5 to be machined, the curve generator 27 machines them with the edge of the cutter by three-axis control to trace the shapes of the lens surfaces 3 and 5 to be machined along the helical machining path 4, as shown in FIG. 5. In FIG. 6, the helical machining path 4 is shown only on the lens surface 5 to be machined, and a helical machining path on the lens surface 3 to be machined is not illustrated.

The helical machining path 4 is a helix that runs toward the outer periphery while going around about the geometrical center 10 of the spectacle lens 1 as the center. The helical machining path 4 is calculated on the basis of a mean curvature C of the surface shape of the lens surface 5 to be machined. Thus, all the spacings (to be referred to as helix spacing as well hereinafter) P (=$P_1, P_2, \ldots P_n$) between the adjacent helix tracks on the lens surface 5 to be machined are constant. In contrast to this, helix spacings d (=$d_1, d_2, \ldots d_n$) of the adjacent helix tracks projected onto an X-Y projection plane are not constant, but change continuously to be small on the peripheral portion where the gradient is large and large at the central portion where the gradient is small.

Furthermore, in the progressive power lens having a complicated lens surface shape, the gradient of the lens surface changes dynamically, and a change in gradient from the lens outer periphery to the center is not constant. If the helix spacings d of the helical machining path 4 on the X-Y projection plane 100 are set to strictly match the gradient of the lens surface shape, the helical machining path 4 itself may deform from an almost circular shape. Then, the cutter moves reciprocally in the X and Y directions. Therefore, a backlash occurs on the X- and Y-axes to make it difficult to machine the lens surface into a desired shape.

In view of this, according to the present invention, the lens surface shape data necessary to calculate the helical machining path 4 is approximated by a spherical shape, and the helical machining path 4 is calculated on the basis of the mean curvature C of the lens surface. Hence, the helical machining path 4 forms an almost circular helical shape that matches the lens shape, and the cutter always moves in a one-directional path from the lens peripheral portion toward the center.

More specifically, X- and Y-coordinates of the machining path on the X-Y projection plane 100 are given by the following equations (1) and (2):

[Equation 1]

$$X = \left[ C \cdot \sin\left\{\arccos\left(\frac{1 - n \cdot dc \cdot dr}{2\pi C^2}\right)\right\} \cdot \cos\left\{\frac{2\pi C}{dr} \cdot \arccos\left(\frac{1 - n \cdot dc \cdot dr}{2\pi C^2}\right)\right\}\right] \quad (1)$$

[Equation 2]

-continued $$Y = \left[ C \cdot \sin\left\{\arccos\left(\frac{1 - n \cdot dc \cdot dr}{2\pi C^2}\right)\right\} \cdot \sin\left\{\frac{2\pi C}{dr} \cdot \arccos\left(\frac{1 - n \cdot dc \cdot dr}{2\pi C^2}\right)\right\}\right] \quad (2)$$

where C is the mean curvature C of the surface shape of the lens surface 5 to be machined, dr is the spacing between consecutive machining points K–k on the helical machining path 4, dc is the average spacing of the adjacent helix spacings d (=$d_1, d_2, \ldots d_n$), and n is an integer.

The spacings d (=$d_1, d_2, \ldots d_n$) of the adjacent helix tracks of the helical machining path 4 are calculated by the following equation (3):

[Equation 3]

$$d = \frac{s}{2A} \cdot \cos\theta \quad (3)$$

where cos θ=dz/dxdy, s is the length of the surface of a virtual lens expressed by a mean radius R of curvature (=1/C), and A is a coefficient determined by the lens diameter, the number of helix tracks, and the like. The average value dc of the spacings d (=$d_1, d_2, \ldots d_n$) of the helix tracks on the X-Y projection plane 100 is about 1.0 mm.

From equations (1) and (2), the helical machining path 4 is a path the helix spacing d of which is large at the lens central portion and continuously decreases toward the outer peripheral portion, as shown in FIG. 5. In FIG. 5, to facilitate understanding, the machining path is drawn simply, different from an actual one, by decreasing the number of tracks of the helix.

The helical machining path 4 is expressed by only X- and Y-coordinates. By calculating the Z-coordinate of the spectacle lens 1 corresponding to the X- and Y-coordinates of the helical machining path 4 from the lens surface shape, the three-dimensional coordinate point on the lens surface is specified and determined as a machining point.

As described above, the helix spacing d of the helical machining path 4 is proportional to the gradient of the lens surface on the X-Y projection plane 100, while the helix spacings P on the lens surface are equidistant. Accordingly, the surface roughness of the lens surface 2 after cutting is almost uniform throughout the entire surface. Therefore, the lens surface 2 can be polished easily in the polishing process which is to be performed after cutting. As the helical machining path 4 differs depending on the surface shape of the lens, it is corrected to a path conforming to the surface shape of each lens by changing the value of the mean curvature C in the above equations (1) and (2) to the value of the mean curvature of the lens surface to be machined.

When cutting the lens surface 5 to be machined, the cutter sequentially passes through the machining points k (FIG. 5) on the helical machining path 4 to perform machining. The machining points k are arranged equidistantly (e.g., spacing dr=0.2 mm) on the helical machining path 4.

Cutting of the lens surface 5 to be machined is one-way machining which is performed by moving the cutter from the lens outer periphery along the helical machining path 4 shown in FIG. 5 and which ends at the lens central portion. In machining, the feed pitch in the horizontal direction perpendicular to the helix of the cutter is controlled so the helix spacing d on the X-Y projection plane 100 increases continuously from the outer periphery of the spectacle lens 1 toward the center.

Figure 13:
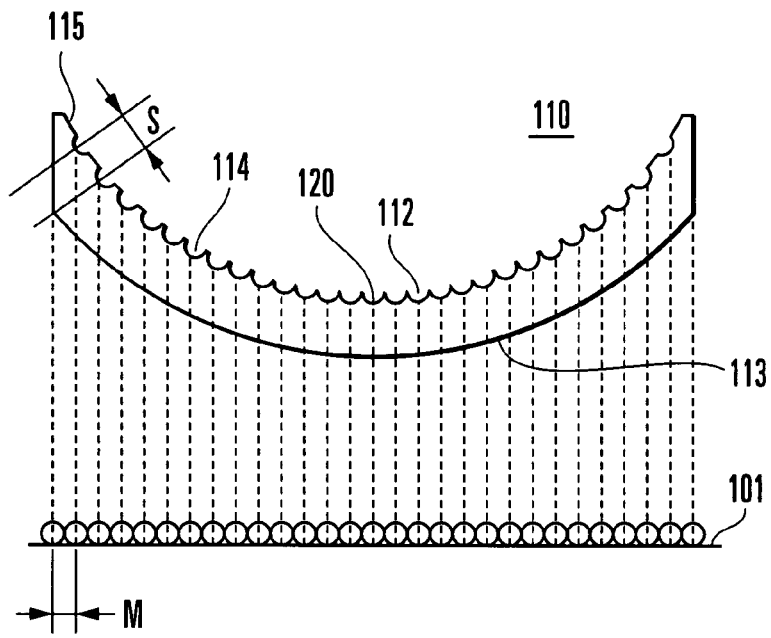
FIG. 13 is a projection view obtained by projecting a conventional helical machining path onto an X-Y projection plane.

When continuously increasing the helix spacing d on the X-Y projection plane 100 from the lens outer periphery toward the center on the basis of the mean curvature C of the surface shape of the lens surface 5 to be machined, all the helix spacings P ($=P_1, P_2, \ldots P_n$) of the helical machining path 4 on the lens surface 5 to be machined become equidistant. In this respect, the present invention is different from the conventional machining method shown in FIG. 13.

Figure 7:
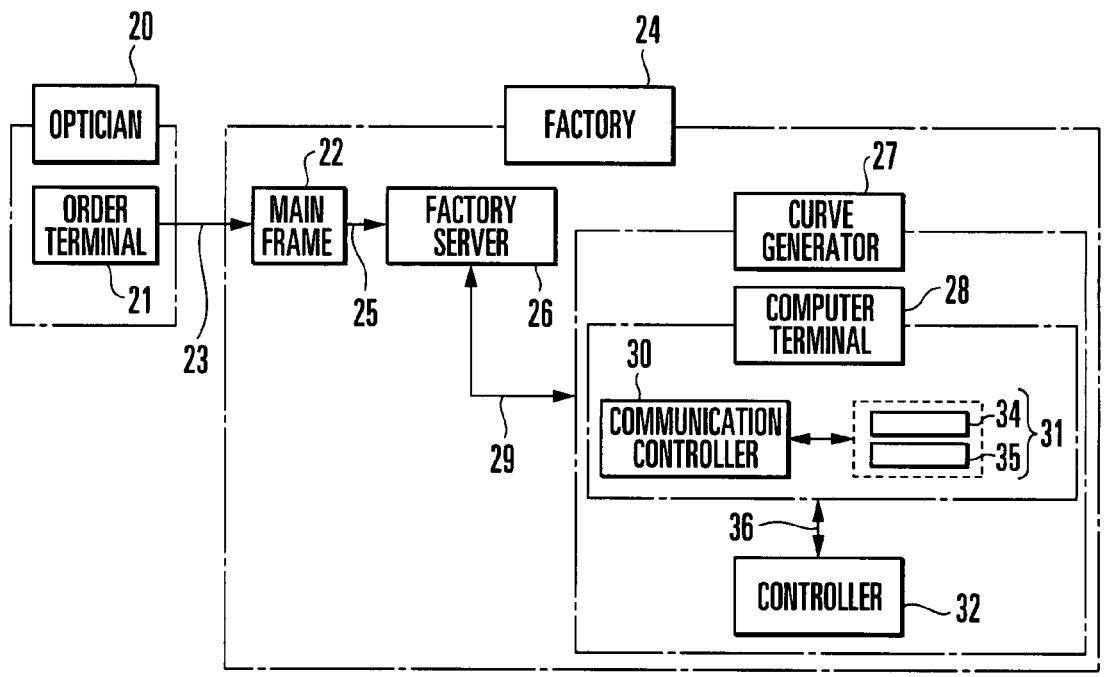
FIG. 7 is a block diagram showing a spectacle lens manufacturing system according to the present invention.

Referring to FIG. 7, the spectacle lens manufacturing system comprises an order terminal 21 and main frame (spectacle lens design device) 22, which connect to each other through a public communication circuit 23. The order terminal 21 is arranged in an optician 20 serving as an order side. The main frame 22 is arranged in a factory 24 serving as a spectacle manufacturer. On the factory 24 side, the main frame 22 connects to a factory server 26 through a LAN 25. The factory server 26 connects to a computer terminal 28 of the curve generator 27 serving as a lens surface cutting apparatus through a LAN 29.

The order terminal 21 at the optician 20 supports input of various types of data necessary when ordering a spectacle lens and displays the input data. The prescription value data of at least an examined eye can be input to the input unit of the order terminal 21. The prescription value data and the like input to the order terminal 21 are transmitted to the main frame 22 of the factory 24 through the communication circuit 23. The main frame 22 receives the prescription value data and the like and stores them as order acceptance data.

(Arithmetic Operation of Machining Data)

The main frame 22 also stores a spectacle lens design program, machining data generation program, and the like. When receiving the prescription value data and the like from the order terminal 21, the main frame 22 designs a spectacle lens in accordance with the programs so as to conform to the prescription values.

The design program has the function of generating the design data of each spectacle lens on the basis of the acquired prescription value data. The machining data generation program has the function of generating machining data, required when the curve generator 27 machines an actual lens, on the basis of the design data generated by the design program. The machining data includes the surface design data, the prescription value data, the type of a blank to be machined, and the like of the spectacle lens.

The main frame 22 executes the spectacle lens design program and machining data generation program to generate the machining data serving as control information for the curve generator 27, and transmits the generated machining data to the factory server 26. The factory server 26 stores the machining data together with the order acceptance number of the order acceptance data. For the purpose of identification, each piece of machining data to be stored is given a serial number, which is used only in the manufacturing factory, for corresponding order acceptance data. The serial number relates the order acceptance data to the machining data.

When acquiring the machining data from the factory server 26 via the LAN 29, the curve generator 27 sequentially cuts the lens surfaces 3 and 5 to be machined of the spectacle lens 1 on the basis of the machining data. Of the lens surfaces 3 and 5 to be machined, either one may be machined first.

According to the first embodiment, the computer terminal 28 makes all requests to the factory server 26 for information in the manufacturing step by referring to serial number information. Upon input of the serial number information, or a barcode including the serial number information, of a manufacture order note attached to the lens before machining through reading by an input device such as a scanner, the computer terminal 28 of the curve generator 27 requests the factory server 26 for the machining data necessary to generate cutting-related information corresponding to the serial number information. In response to the request, the factory server 26 transmits the machining data to a communication controller 30 of the computer terminal 28 via the LAN 29. The machining data to be transmitted includes, e.g., the surface design data and prescription value data of the spectacle lens, the type of the spectacle lens, and the like. The machining data is a set of functions or numerical values which are combinations of three-dimensional coordinates (x, y, z).

The computer terminal 28 has the communication controller 30, an arithmetic processor 31, and a controller (control means) 32 which controls the cutter. The arithmetic processor 31 comprises a mean curvature calculation unit (means) 34 which calculates the mean curvatures C ($C_1$ and $C_2$) of the lens surfaces 3 and 5 to be machined of the spectacle lens 1, and a helical machining path calculation unit (means) 35 which calculates the helical machining paths 4 respectively corresponding to the mean curvatures C of the lens surfaces 3 and 5 to be machined. The communication controller 30, arithmetic processor 31, and controller 32 connect to each other through a LAN 36. The arithmetic processor 31 calculates in detail data necessary for machining from the received machining data. The contents of the calculation result include the mean curvatures C of the lens surfaces 3 and 5 to be machined of the spectacle lens, the helical machining paths 4 and helix spacings P and d on the X-Y projection plane 100 of the lens surfaces 3 and 5 to be machined, and the three-dimensional lens surface shape data (X, Y, Z) that matches the helical machining paths 4 (X, Y).

Figure 8:
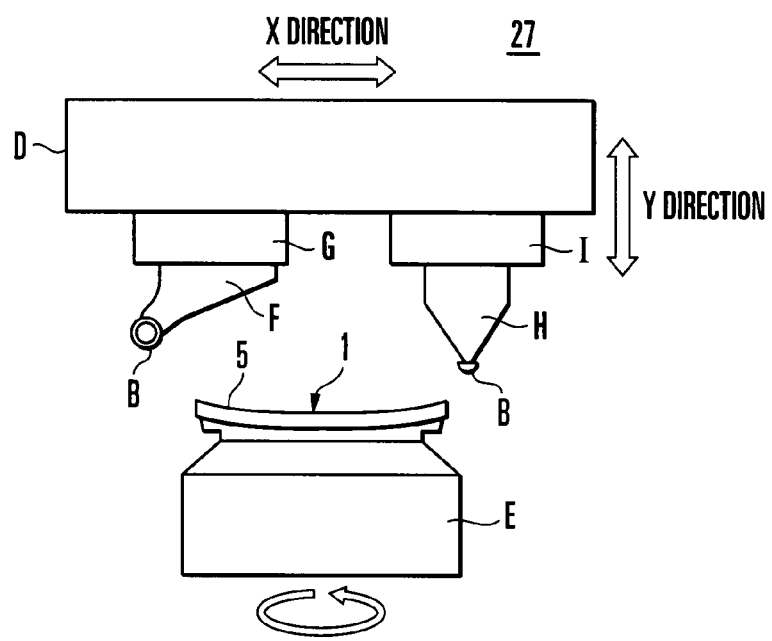
FIG. 8 is a schematic view showing the arrangement of a numerically controlled curve generator.

The curve generator 27 shown in FIG. 8 is controlled in three axes by numerical control and comprises a lower spindle E and upper spindle D.

The spectacle lens 1 is attached to the lower spindle E. The lower spindle E axially rotates without shifting. The upper spindle D comprises two spindles, i.e., a first upper spindle portion G to which a first cutting tool F for rough cutting attaches, and a second upper spindle portion I to which a second cutting tool H for finishing cut attaches. The upper spindle D slides in the X direction with respect to the fixed lower spindle E to switch between the first and second upper spindle portions G and I. As the material of cutting blades B of the first and second cutting tools F and H, for example, sintered diamond or single-crystal diamond is employed.

When cutting the lens surface 5 to be machined, comprising a convex surface, of the spectacle lens 1 by the cutting blades B, the computer terminal 28 transfers design shape height data of the concave surface expressed by a matrix to the controller 32 (FIG. 7) of the computer terminal 28. The computer terminal 28 also calculates the helical machining path 4 that matches the concave surface shape from the equations (1) and (2) described above and transfers it to the controller 32. The controller 32 controls the upper spindle D and first and second upper spindle portions G and I, and the cutting blades B of the cutting tools F and H move along the machining points k on the helical machining paths 4, thereby cutting the lens surface 5 to be machined. Such a curve generator 27 has a machining accuracy within 3 μm (lens diameter: 50 mm) and a maximal surface roughness Rmax of about 0.3 μm to 0.5 μm.

After this, the polishing apparatus polishes the cut lens surface 2 to finish it into an optical surface formed of a predetermined curved surface. As the polishing apparatus, a conventionally known apparatus, e.g., a polishing apparatus disclosed in FIG. 1 of Japanese Patent Laid-Open No. 2003-266287, or a versatile polishing apparatus (TORO series) which is generally commercially available, is employed.

When polishing of the lens surface 2 comprising the concave surface is ended, the curve generator 27 consecutively cuts the lens surface 3, comprising a convex surface, to be machined in the same manner, and the polishing apparatus polishes it to finish it into a predetermined optical surface.

Figure 9:
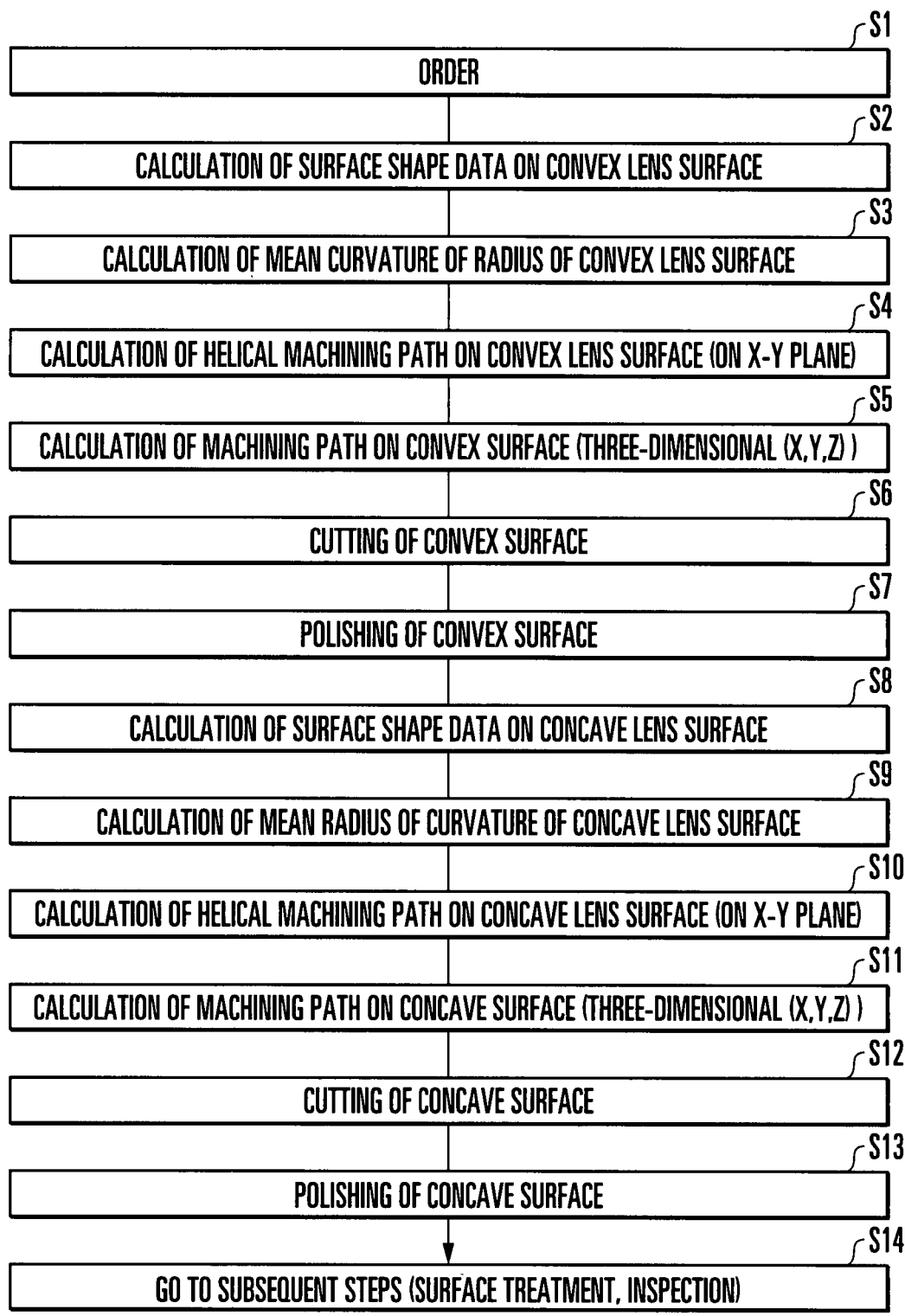
FIG. 9 is a flowchart showing the procedure from order placement to delivery of the spectacle lens according to the present invention.

The sequence from order acceptance to delivery of the spectacle lens will be described with reference to FIGS. 7 and 9.

Step S1: Order

First, the main frame 22 of the factory 24 accepts a request for fabrication of a spectacle lens from the optician 20 (order acceptance). Prior to the order of the spectacle lens, the optician 20 inputs to the order terminal 21 the process data of the examined eye of the customer, the lens type, and the other specification information of the spectacle lens which are necessary to design a lens.

The specification information includes the type of the spectacle lens and specific information. The prescription data includes the spherical refractive power, cylindrical refractive power, cylinder axis, and addition power of each of the two, left and right eyes of the customer, the interpupillary distance, the naked eye vision, and the like. The order terminal 21 transmits the input spectacle lens information and prescription values to the main frame 22 online via the communication circuit 23 to request fabrication of the spectacle lens.

Step S2: Calculation of Surface Shape Data on Convex Lens Surface

Upon acceptance of the request for fabrication of the spectacle lens from the optician 20, the main frame 22 calculates machining data to be used by the curve generator 27 from the received data, and stores it in the factory server 26 or transfers it to the curve generator 27 via the LAN 29. The machining data is output in such a format that it can be used by various machining apparatuses and inspection apparatuses, and includes at least the concave and convex surface shape data on the spectacle lens.

Step S3: Calculation of Mean Curvature of Convex Lens Surface

Subsequently, the computer terminal 28 calculates the mean radius R ($R_T$) of curvature of the convex surface shape data on the spectacle lens. The mean radius $R_T$ of curvature is a radius of curvature that minimizes a difference of approximation when approximating the entire surface shape of the spectacle lens by a spherical shape. In practice, the difference between a lens shape value and the approximate spherical surface is calculated by a calculator or the like in accordance with the method of least squares. The radius of curvature that minimizes the difference is determined as the mean radius $R_T$ of curvature. A mean curvature $C_T$ is calculated from the obtained mean radius $R_T$ of curvature. The mean curvature $C_T$ is a reciprocal ($=1/R_T$) of the mean radius $R_T$ of curvature.

Step S4: Calculation of Helical Machining Path on Convex Lens Surface (on X-Y Projection Plane)

Subsequently, the computer terminal 28 substitutes the preset average spacing dc ($dc_T$) of adjacent helix tracks, the machining point spacing dr ($dr_T$) on the continuous helical machining path 4, and the calculated mean curvature $C_T$ into equations (1) and (2). Equation (1) expresses a machining point position in the X direction, and equation (2) expresses a machining point position in the Y direction. The preset average spacing $dc_T$ and machining point distance $dr_T$ differ depending on the material and shape and are accordingly determined experimentally.

Step S5: Calculation of Machining Path on Convex Surface (Three-Dimensional)

The surface shape data on the spectacle lens is expressed by a function of three-dimensional data (X, Y, Z). Substitution of the values of the two-dimensional data (X, Y) on the helical machining path into the surface shape data comprising the three-dimensional data (X, Y, Z) specifies the corresponding machining point k on the lens surface to establish its respective three-dimensional machining point position coordinates (X, Y, Z). The respective three-dimensional machining point position coordinates (X, Y, Z) are then sent to the curve generator 27.

Step S6: Cutting

Subsequently, the convex surface is cut.

The curve generator 27 cuts the convex surface 3 by controlling the cutter to move on the helical machining path 4 calculated in step S4 in accordance with the specified three-dimensional machining point position coordinates (X, Y, Z), thus creating a desired surface shape.

Step S7: Polishing of Convex Surface

Subsequently, polishing of the cut convex surface 3 is performed. In polishing, the curve generator 27 cuts the convex surface 3 of the spectacle lens into a predetermined shape. After that, the spectacle lens is removed from the curve generator 27 and attached to the polishing apparatus to polish the cut lens surface.

Step S8: Calculation of Surface Shape Data on Convex Lens Surface

When polishing of the convex surface 3 is ended, the spectacle lens is removed from the polishing apparatus and mounted on the lower spindle E of the curve generator 27 again with the concave surface 2 facing up. The main frame 22 calculates machining data to be used by the curve generator 27 from the received data, and stores it in the factory server 26 or transfers it to the curve generator 27 via the LAN 29. The machining data is output in such a format that it can be used by various machining apparatuses and inspection apparatuses, and includes at least the convex surface shape data on the spectacle lens.

Step S9: Calculation of Mean Curvature of Concave Lens Surface

Subsequently, the computer terminal 28 calculates the mean radius R ($R_O$) of curvature of the concave surface shape data on the spectacle lens. The mean radius $R_O$ of curvature of the concave surface 2 is a radius of curvature that minimizes a difference of approximation when approximating the entire surface shape of the spectacle lens 1 by a spherical shape. In practice, a computer or the like calculates the difference between a lens shape value and an approximate spherical surface in accordance with the method of least squares. The radius of curvature that minimizes the difference is determined as the mean radius $R_O$ of curvature. A mean curvature $C_O$ ($=1/R_O$) is calculated from the obtained mean radius $R_O$ of curvature.

Step S10: Calculation of Helical Machining Path on Concave Lens Surface (on X-Y Projection Plane)

Subsequently, the computer terminal 28 substitutes the preset average spacing dc ($dc_O$) of adjacent helix tracks, the machining point spacing dr ($dr_O$) on the continuous helical machining path 4, and the calculated mean curvature $C_O$ into equations (1) and (2). Equation (1) expresses a machining point position in the X direction, and equation (2) expresses a machining point position in the Y direction. The preset average spacing $dc_0$ and machining point distance $dr_0$ differ depending on the material and shape and are accordingly determined experimentally.

Step S11: Calculation of Machining Path on Concave Surface (Three-dimensional)

The concave surface shape data on the spectacle lens 1 is expressed by a function of three-dimensional data (X, Y, Z). Substitution of the values of the two-dimensional data (X, Y) of the helical machining path specifies the corresponding machining point k on the concave surface 2. The respective three-dimensional machining point position coordinates (X, Y, Z) are then sent to the curve generator 27.

Step S12: Cutting

Subsequently, the curve generator 27 cuts the concave surface 2 of the spectacle lens 1.

Step S13: Polishing of Concave Surface

When cutting of the concave surface 2 is ended, the cut concave surface 2 is polished. Polishing of the concave surface 2 employs the polishing apparatus used to polish the convex surface.

Step S14: Subsequent Steps

When polishing is ended, the convex surface 3 and concave surface 2 are dyed, surface-treated, and inspected. The spectacle lens 1 that has passed the inspection is shipped as a product to the optician that has requested it.

As described above, in the lens surface cutting apparatus according to the present invention, the mean curvature calculation unit 34 calculates the mean curvature C ($C_T$, $C_0$) of the lens surface 5 to be machined, and the helical machining path calculation unit 35 calculates the helical machining path 4 that matches the mean curvature C. Thus, in the helical machining path 4, the spacings P between the adjacent tracks on the lens surface 5 to be machined become equidistant, and the helix spacing d between the adjacent tracks on the X-Y projection plane 100 continuously increases from the lens outer periphery toward the lens center. This corrects the surface roughnesses at the central portion and peripheral portion of the spectacle lens 1, so that the entire lens surface can have uniform surface roughness. Therefore, the polishing amount during polishing becomes equal between the central portion and the outer peripheral portion to shorten the polishing time. When the polishing amount is uniform throughout the entire surface, the error between the surface shape obtained by cutting and the surface shape after polishing is small, to provide an optical surface that is close to a desired surface shape.

Comparison With Prior Art (Equidistant Helical Machining Path)

Figure 10:
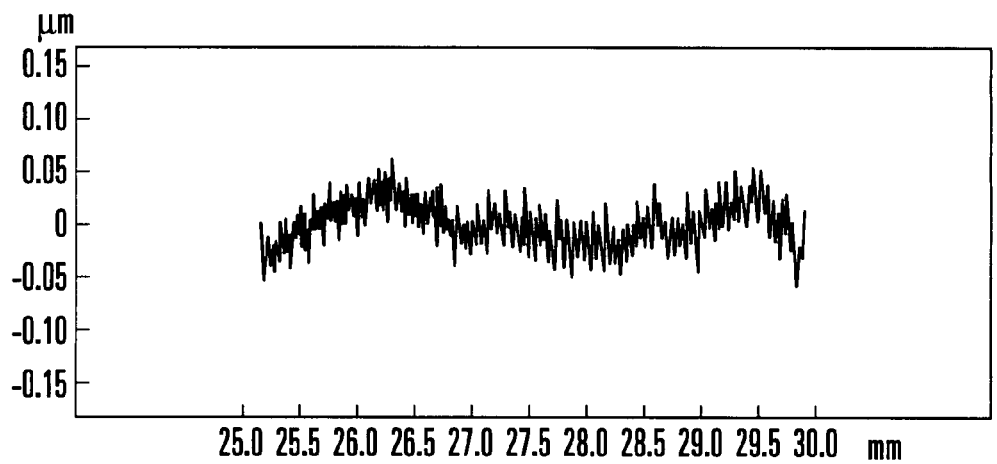
FIG. 10 shows the measurement values of the cutting surface with a helical machining path which is formed by the lens cutting apparatus according to the present invention.
Figure 14:
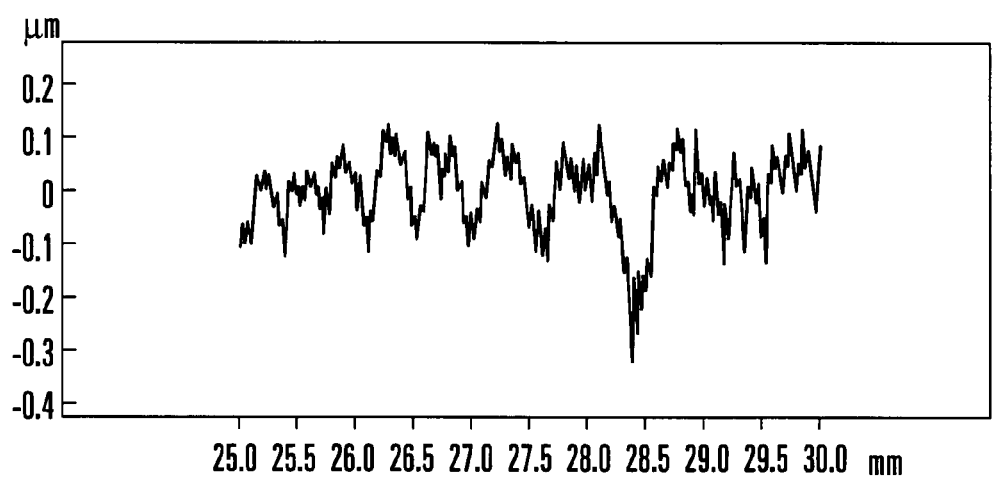
FIG. 14 shows the measurement values of a cutting surface with a conventional helical machining path.

FIG. 10 shows the surface roughness, variations, and maximal surface roughness (Rmax=0.13 μm) of the lens surface which is cut by the machining method of this embodiment. As is apparent from FIG. 10, the machining method of this embodiment can sufficiently decrease the surface roughness, variations, and maximal surface roughness (Rmax=0.13 μm) of the lens surface when compared to the conventional machining method shown in FIG. 14. In the measurement of FIGS. 10 and 14, the material, diameter, and surface shape of the sample lens, the cutting apparatus, the cutting amount, the cutting blades, the polishing time, the polishing method, the polishing agent, the polishing pad, the polishing tool, the polishing apparatus, the polishing temperature, the polishing pressure, and the measurement range of the lens surface are all the same except the helical machining path.

The second embodiment of the present invention will be described.

The cutting method according the first embodiment described above is exemplified by the following case. The mean curvature C is calculated only from the surface shape of the lens surface 5 (the lens surface 3 as well) to be machined of the spectacle lens 1. By calculating the helical machining path 4 that matches the mean curvature C, the helix spacings P on the lens surface 5 to be machined are made constant. The helix spacing d on the X-Y projection plane 100 is increased continuously from the lens outer periphery toward the center. This uniforms the surface roughness of the lens surface.

Figure 11:
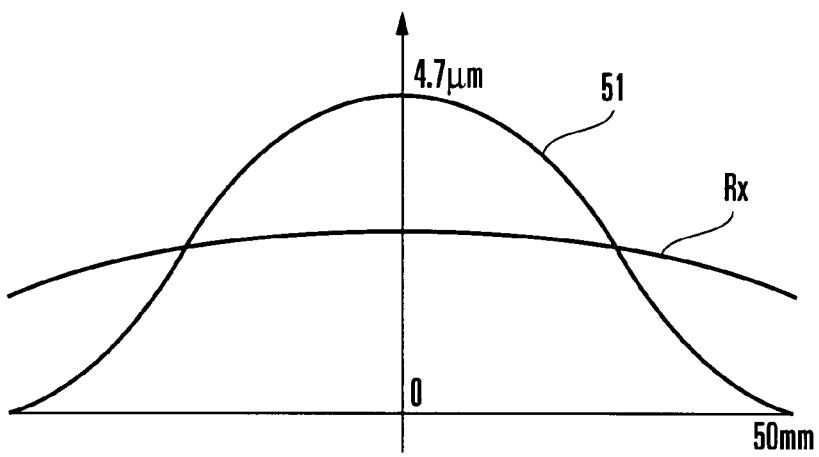
FIG. 11 is a graph showing polishing removal amount characteristics.

However, the polishing removal amount characteristics of the polishing apparatus are not always constant among the respective portions on the lens surface, but usually show a truncate Gaussian distribution 51 as shown in FIG. 11, in which the removal amount is maximal at the central portion and minimal at the peripheral portion. When polishing the lens surface using the polishing apparatus having such polishing removal amount characteristics, polishing of the central portion is completed at an early polishing stage. As the polishing amount at the peripheral portion is not sufficient, however, polishing is to be done continuously. Then, during the continuous polishing as well, the lens central portion continues to be further polished, and accordingly the polishing removal amount at the central portion increases. When the peripheral portion is polished and polishing of the entire lens surface is ended, the central portion has been polished excessively, and the surface shape becomes different from a desired one. As the central portion is polished more than necessary, the time required for polishing prolongs. Therefore, considering polishing after cutting, it is preferable to set the lens surface 2 to have surface roughness that matches the polishing removal amount characteristics rather than to uniform the surface roughness of the lens surface 2 throughout the entire surface.

Hence, according to the second embodiment, when performing cutting, a helical machining path 53 (see FIG. 12) that matches the polishing removal amount characteristics of the polishing apparatus is calculated in advance. More specifically, when the polishing removal amount of the polishing apparatus to be used in the post-process shows the truncate Gaussian distribution 51 shown in FIG. 11, the mean curvature of the lens surface to be machined is calculated on the basis of both the surface shape of the lens surface to be machined and the polishing removal amount characteristics. The helical machining path 53 that matches the mean curvature is calculated, and the cutter is controlled on the basis of the helical machining path 53 to cut the lens surface to be machined.

Figure 12:
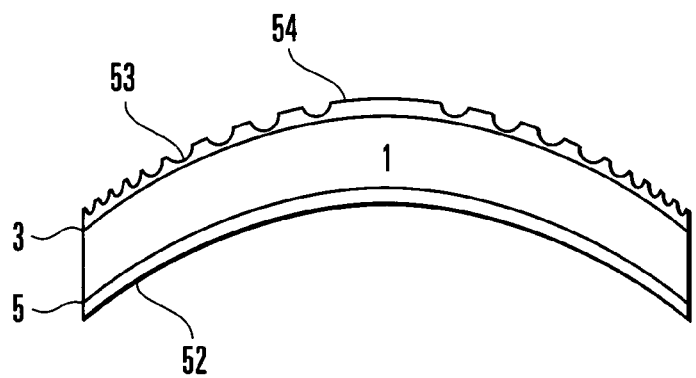
FIG. 12 is a view showing a machined lens surface with a helical machining path that matches the polishing removal amount characteristics.

In this case, as shown in FIG. 12, a helix spacing P of the helical machining path 53 on the lens surface to be machined is not constant, unlike in the machining method according to the first embodiment, but becomes maximal at the lens central portion and minimal at the peripheral portion. The surface roughness after cutting is not uniform either, but becomes maximal at the central portion and minimal at the outer peripheral portion. Hence, the polishing removal amount becomes maximal at the central portion and minimal at the outer peripheral portion. Consequently, when performing polishing using the polishing apparatus having the polishing removal amount characteristics described above, the respective portions of the lens surface can be polished simultaneously and completed simultaneously.

In general, in cutting, provided that conditions such as the cutter and cutting apparatus are the same, the machining time is inversely proportional to the surface roughness. An increase in the surface roughness of the lens central portion shortens the time taken for cutting. As the polishing time does not change, the total machining time concerning cutting and polishing can be shortened. This can reduce the cost concerning the manufacture and shorten the period for delivery.

The machining method with the polishing removal amount characteristics considered will be briefly described. As this machining method partly overlaps the first embodiment, a description will be made on only a method of calculating the helical machining path 53 in accordance with the polishing removal amount characteristics, and a description on the overlapping portion will be omitted.

This embodiment also calculates the helical machining path 53 using the above equations (1) and (2). The polishing removal amount characteristics differ depending on the polishing method, polishing agent, polishing pressure, polishing pad, lens material, and the like, and will accordingly be measured in advance experimentally.

First, to calculate the helical machining path 53, a mean radius $R_x$ of curvature (FIG. 11) of the curve of the polishing removal amount characteristics is initially calculated. In the case of the characteristics of the Gaussian distribution 51 shown in FIG. 11, for example, $R_x$ becomes approximately 500,000 mm. When converting this into a curvature (C'), it corresponds to approximately 0.001192 curve. Meanwhile, the radius (C) of the desired lens surface shape is determined as 5 D. When calculating the curvature (C+C') of a virtual curved surface by adding the mean curvature C' (=0.001192 curve) of the polishing removal amount characteristic value and the curvature C (=5 D) of the desired lens surface shape, 5.001192 D is obtained. In FIG. 12, when a lens surface 5 to be machined is a concave surface, reference numeral 52 denotes a moderate convex virtual curved surface. When the lens surface 5 to be machined is a convex surface, reference numeral 54 denotes the virtual curved surface of a lens surface 3 to be machined. These virtual curved surfaces 52 and 54 have radii of curvature that are larger than that of the actual lens surface 5 to be machined, and increase the apparent lens thickness. A helix spacing (d) also changes accordingly to be much larger toward the lens central portion.

Substitution of the curvature C+C' (5.001192 D) of the virtual curved surface 52 obtained by addition for C in equations (2) and (3) yields the following equations (4) and (5). X'- and Y'-coordinates of the helical machining path 53 on an X-Y projection plane 100 are calculated from equations (4) and (5):

[Equation 4]

$$X' = \left[ C \cdot \sin\left\{ \arccos\left( \frac{1 - n \cdot dc \cdot dr}{2\pi(C + C')^2} \right) \right\} \cdot \cos\left\{ \frac{2\pi C}{dr} \cdot \arccos\left( \frac{1 - n \cdot dc \cdot dr}{2\pi(C + C')^2} \right) \right\} \right] \quad (4)$$

[Equation 5]

$$Y' = \left[ C \cdot \sin\left\{ \arccos\left( \frac{1 - n \cdot dc \cdot dr}{2\pi(C + C')^2} \right) \right\} \cdot \sin\left\{ \frac{2\pi C}{dr} \cdot \arccos\left( \frac{1 - n \cdot dc \cdot dr}{2\pi(C + C')^2} \right) \right\} \right] \quad (5)$$

The helical path calculated by equations (4) and (5) is the helical machining path 53 with the polishing removal amount characteristics considered. As is apparent from FIG. 12, on the lens surface 54 to be machined, the helix spacing of the helical machining path 53 is narrow at the outer peripheral portion and increases continuously toward the central portion. Hence, the polishing removal amount is maximal at the central portion and minimal at the outer peripheral portion. In this connection, the maximal value of the polishing removal amount falls within a range of 1 μm to 20 μm and preferably 5 μm to 15 μm. In FIG. 11, the maximal value of the polishing removal amount is 4.7 μm.

With the cutting method according to the second embodiment, when performing polishing using the polishing apparatus with the polishing removal amount characteristics that show the truncate Gaussian distribution shown in FIG. 11 and the polishing removal amount that is maximal at the central portion and minimal at the peripheral portion, as the peripheral portion has small surface roughness, the lens surface 54 to be machined can be polished easily. As a result, the entire polishing amount is uniform and small, so the polishing time can be shortened. Since the polishing removal amount of the lens surface 54 to be machined can be decreased, the surface shape after cutting can be maintained. This can decrease a shape error caused by polishing.

In each of the first and second embodiments described above, the present invention is applied to a progressive multifocal lens. However, the present invention is not limited to this at all, but can naturally be applied to a spectacle lens formed of a general spherical lens. In this case, the curvature may replace the mean curvature.

In each of the first and second embodiments described above, cutting is performed helically from the lens outer periphery toward the center. However, the present invention is not limited to this. Depending on the radii of curvature of the target optical surfaces 2 and 3, cutting may be performed helically from the center toward the lens outer periphery.

The invention claimed is:

1. A lens surface cutting method for a spectacle lens, comprising the steps of:

calculating a helical machining path with a helix spacing that increases continuously on an X-Y projection a plane from a lens outer periphery toward a center;

helically cutting a lens surface to be machined of a spectacle lens by cutting means; and calculating a mean curvature from a surface shape of the lens surface to be machined, wherein the step of calculating the mean curvature from the surface shape of the lens surface to be machined further comprises the step of calculating the helical machining path that matches the mean curvature.

2. A lens surface cutting method for a spectacle lens according to claim 1, characterized in that the step of calculating the helical machining path comprises the step of calculating each helix spacing d of the helical machining path on the X-Y projection plane by:

$$d = \frac{s}{2A} \cdot \cos\theta \quad \text{[Equation 1]}$$

where cos θ=dz/dxdy, s is the length of a surface of a virtual lens expressed by a mean radius R of curvature, and A is a coefficient determined by a lens diameter, the number of helix tracks, and the like.

3. A lens surface cutting method for a spectacle lens according to claim 2, characterized in that the step of calculating the helical machining path comprises the step of calculating X- and Y-coordinates of the helical machining path on the X-Y projection plane by:

[Equation 2]
$$X = \left[C \cdot \sin\left\{\arccos\left(\frac{1-n\cdot dc\cdot dr}{2\pi C^2}\right)\right\} \cdot \cos\left\{\frac{2\pi C}{dr} \cdot \arccos\left(\frac{1-n\cdot dc\cdot dr}{2\pi C^2}\right)\right\}\right]$$

[Equation 3]
$$Y = \left[C \cdot \sin\left\{\arccos\left(\frac{1-n\cdot dc\cdot dr}{2\pi C^2}\right)\right\} \cdot \sin\left\{\frac{2\pi C}{dr} \cdot \arccos\left(\frac{1-n\cdot dc\cdot dr}{2\pi C^2}\right)\right\}\right]$$

where C is the mean curvature of the lens surface to be machined, dr is the spacing between consecutive machining points on the helical machining path, dc is the average spacing of helix spacings d of the helical machining path on the X-Y projection plane, and n is an integer.

4. A lens surface cutting method for a spectacle lens, comprising the steps of:
calculating a helical machining path with a helix spacing that increases continuously on an X-Y projection plane from a lens outer periphery toward a center;
helically cutting a lens surface to be machined of as spectacle lens by cutting means; and
calculating the mean curvature of the lens surface to be machined on the basis of both the surface shape of the lens surface to be machined of the spectacle lens and polishing removal amount characteristics indicating an amount to be removed by polishing,
wherein the step of calculating the mean curvature of the lens surface to be machined comprises the step of calculating the helical machining path that matches the mean curvature.

5. A lens surface cutting method for a spectacle lens according to claim 4, characterized in that the step of calculating the helical machining path comprises the step of converting the polishing removal amount into a curvature C' on the X-Y projection plane, calculating a curvature (C+C') of a virtual curved surface obtained by adding the curvature C' and the mean curvature, and calculating the X'- and Y'-coordinates of the helical machining path on the X-Y projection plane by:

[Equation 4]
$$X' = \left[C \cdot \sin\left\{\arccos\left(\frac{1-n\cdot dc\cdot dr}{2\pi(C+C')^2}\right)\right\} \cdot \cos\left\{\frac{2\pi C}{dr} \cdot \arccos\left(\frac{1-n\cdot dc\cdot dr}{2\pi(C+C')^2}\right)\right\}\right]$$

[Equation 5]
$$Y' = \left[C \cdot \sin\left\{\arccos\left(\frac{1-n\cdot dc\cdot dr}{2\pi(C+C')^2}\right)\right\} \cdot \sin\left\{\frac{2\pi C}{dr} \cdot \arccos\left(\frac{1-n\cdot dc\cdot dr}{2\pi(C+C')^2}\right)\right\}\right]$$

where dr is the spacing between consecutive machining points on the helical machining path, dc is the average spacing of helix spacings d of the helical machining path, and n is an integer.

6. A spectacle lens characterized in that a lens surface is formed by a lens surface cutting method for a spectacle lens according to claim 1.

7. A spectacle lens characterized in that a lens surface is formed by a lens surface cutting method for a spectacle lens according to claim 4.

8. A lens surface cutting method for a spectacle lens according to claim 4, characterized in that the step of cutting the lens surface to be machined comprises the step of helically cutting the lens surface to be machined from the outer periphery toward the center.

9. A lens surface cutting method for a spectacle lens according to claim 1, characterized in that the step of cutting the lens surface to be machined comprises the step of helically cutting the lens surface to be machined from the outer periphery toward the center.

* * * * *

UNITED STATES PATENT AND TRADEMARK OFFICE
CERTIFICATE OF CORRECTION

PATENT NO. : 7,861,626 B2 Page 1 of 1
APPLICATION NO. : 11/665731
DATED : January 4, 2011
INVENTOR(S) : Hideo Toriumi and Shigeru Takizawa It is certified that error appears in the above-identified patent and that said Letters Patent is hereby corrected as shown below:

On the Title Page, Item [86], delete "PCT/JP2006/025375" and insert
--PCT/JP2006/325375--.

Signed and Sealed this
Twenty-second Day of November, 2011

David J. Kappos
*Director of the United States Patent and Trademark Office*